Aug. 16, 1938. E. R. POWELL Re. 20,828

PROCESS AND FURNACE FOR MAKING MINERAL WOOL

Original Filed July 27, 1928

INVENTOR.
EDWARD R. POWELL.

BY Fackenthal & Fackenthal
Goldsmith & Galt
ATTORNEYS.

Reissued Aug. 16, 1938

Re. 20,828

UNITED STATES PATENT OFFICE 20,828

PROCESS AND FURNACE FOR MAKING MINERAL WOOL

Edward R. Powell, Cleveland Heights, Ohio, assignor, by mesne assignments, to Johns-Manville Corporation, New York, N. Y., a corporation of New York Original No. 2,057,393, dated October 13, 1936, Serial No. 295,675, July 27, 1928. Renewed January 31, 1935. Application for reissue March 3, 1938, Serial No. 193,639

7 Claims. (Cl. 49—77.5)

Figures 1, 2:
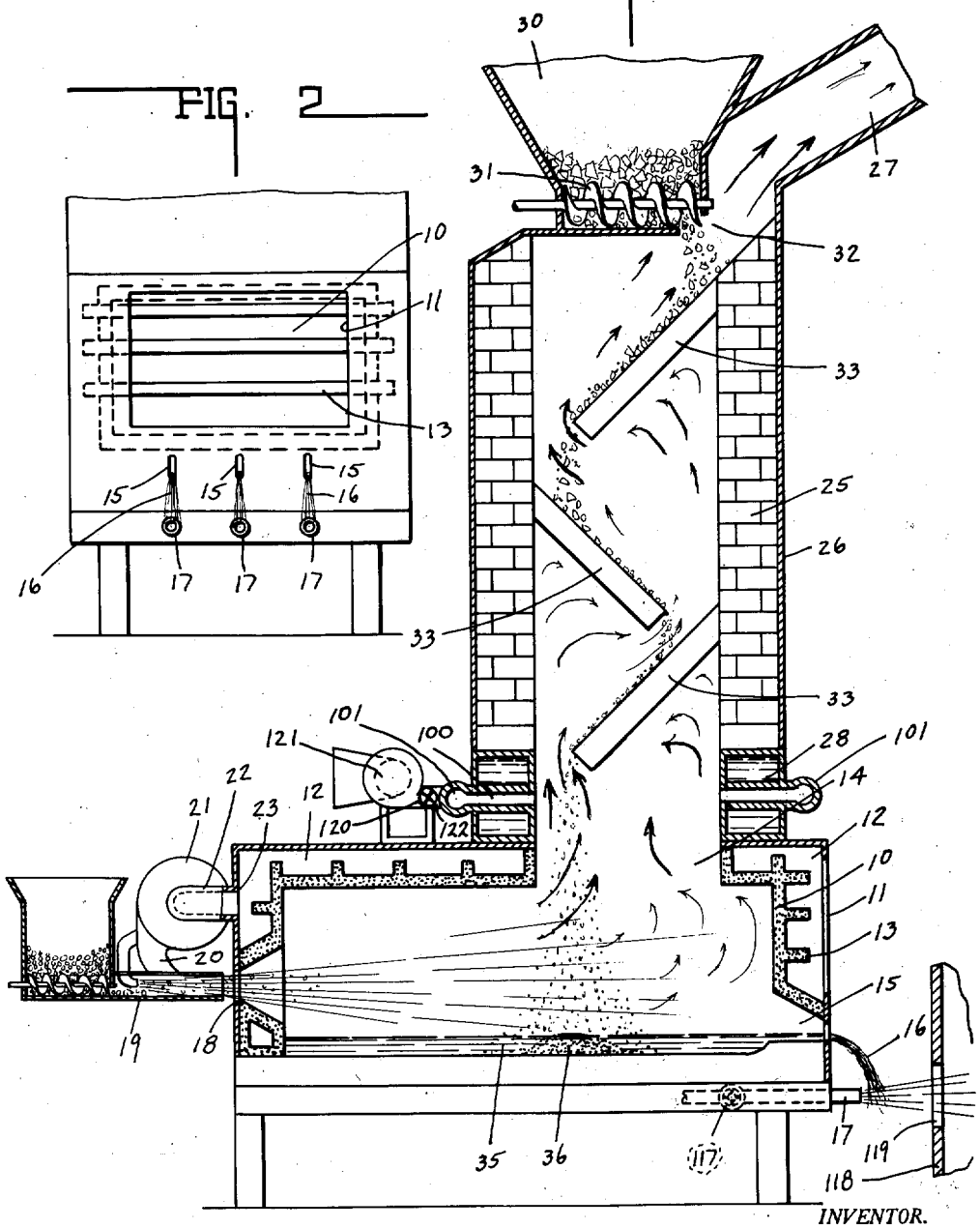

This invention relates to a furnace for the economical production of mineral fibre, commonly called rock wool. The terms "mineral" and "mineral wool" are employed hereinafter in a generic sense as is customary in the art to denote respectively rock, slag and other conventional raw materials, and the fibres made therefrom.

The chief object of this invention is to produce economically, with a minimum of waste and at a relatively rapid rate, a molten stream of mineral material suitable for blasting into mineral wool.

A feature of the invention consists in the utilization of relatively powdered fuel whereby an intensification in action is obtained, and relatively fine raw material falls in countercurrent relation to the flame so that the raw material is surrounded on all sides by the flame.

Another feature of the invention is to provide a large bath or pool of melted material so the various ingredients will have the opportunity of mixing and reacting and from which two or more streams of nearly equal size may be drawn.

Another feature of the invention is that, by varying the different blast pressures and since there is a slight difference in viscosity between the several streams, the material or wool formed from each combination can be regulated to either produce a substantially uniform material or as preferably desired, a material having coarse as well as fine fiber, and the two types of material when intermingled produce final material of good mechanical strength as well as good insulating value and to a degree not obtainable with a single nozzle furnace.

The full nature of the invention will be understood from the accompanying drawing and the following description and claims.

In the drawing Fig. 1 is a vertical section of one embodiment of a furnace including the invention. Fig. 2 is an end view of the spout or discharge end of the furnace.

In the drawing, 10 indicates a combustion chamber of refractory material such as carborundum or chromite block encased as at 11 forming an air passage 12 therebetween into which extends veins 13 of the refractory wall for furnace cooling. The combustion chamber includes a discharge outlet 14 for the gases which also serves as a charge-receiving intake. The combustion chamber has one or more spouts or tap holes 15 from which discharge the molten streams 16 which are blasted by air or steam supplied as at 17 to form the mineral fiber or wool.

The means for combustion are supplied through the opening 18 and herein said supply consists of a blast including air, preferably heated, and powdered fuel in the form of powdered coal. Coal is supplied under pressure through pipe 19 and with some air. Air supplied through pipe 20, is carried to the blower 21 through the pipe 22 connected at 23 to the chamber 12, which chamber has an open face at its opposite end so that air will be drawn through the chamber taking heat from the refractory wall. The air passed through the blower to the discharge assists in the discharge of the powdered fuel, such as coal. The hot air and the fuel burn completely and the flames and the gases pass forward through the combustion chamber and upwardly through the stack 25 suitably insulated as at 26, and pass from said stack to the smoke pipe 27 and thence to the chimney. To assist in the production of the steam employed in the blast 17, a water jacket 28 is included in the stack construction.

Positioned at the top of the stack is a hopper 30 having a control discharge in the form of a measuring device such as a measuring screw 31 at the outlet 32 therefrom. The material in the hopper 30 consists of the mineral to be melted, and, preferably, such mineral is in the form of pieces of relatively small size, that is, it is crushed to about one-half inch or smaller. The crushed mineral is introduced into the combustion chamber by a gas and material flow arrangement, such that it enters the combustion chamber at substantially the melting point and in a melting condition.

Means for securing this operation consists in alternate baffles 33 arranged to cause the departing gases to take a sinuous path and the entering material to take a similar coincidental but reverse path. The cold material is intimately contacted by the colder portion of the gases, and, as the crushed mineral approaches the combustion chamber, its temperature rises as also does the temperature of the stack, by reason of the increase in temperature of the gases as the combustion chamber is approached.

The stack-discharged, melting, crushed material passes through the flames or is heated thereby and is completely melted and collects at the bottom in the stream bed 35. In all probability there is also formed in said stream bed a cone 36 of unmelted rock. The molten bath at the stream bed is drawn off through the tap holes 15.

The present invention permits the utilization of small pieces of mineral and thus the employment of a conveyor system from the mine to the furnace, if the distance between the two be not excessive. But, more important than this is the change from coke to a powdered fuel, such as coal. This reduces the fuel cost approximately 80% or more. The use of relatively fine or crushed mineral does not require a long temperature contact period to melt the smaller particles. Also, the small size of the mineral particles permits each particle to be intimately contacted by the hot gases passing from the combustion chamber so that the raw material is preheated substantially to the melting point before it discharges into the combustion chamber and, by reason of the small size of the said material, contact with the flames in the combustion chamber immediately melts the mineral and the liquid is ready for discharge through the tap holes. Thus, a very high temperature is obtained at the melting point of the material thereby providing a better physical condition of the molten mineral which in turn permits the production of better fibre or a greater proportion of a commercially acceptable fibre.

Another economy in operation consists in utilizing the heat radiating from the combustion chamber for pre-heating the air supplied to the fuel. This, while apparently insignificant, is of considerable importance, since the temperature of the air does not have to be raised to the heat of the furnace at the melting point from that of the atmosphere. The temperature of the furnace in the interior at the contact point of the flame and the mineral material is between 3000 and 3500 degrees Fahrenheit or thereabout. The introduction of air under ordinary temperatures to the interior of a furnace with the before-mentioned temperature therein would involve an unnecessary fuel loss and cooling of the furnace.

By reason of the intense heat and arrangement employed herein, it may be necessary, in order to prevent pre-melting, to add cold air to the ascending gases of combustion and herein the condition of this character is illustrated by the cold air discharge pipe 100 connected to a header 101 in turn connected by line 122 to a blower 121 controlled by a valve 120. This arrangement insures positive cooling to the adjusted degree. If desired, the blower may be omitted and the header intake or intakes suitably controlled so that the draft in the stack will serve to direct into the stack a suitably adjusted amount of cool air. The result is that pre-melting of the material, while passing through the stack, is prevented and clogging of the melted material in said stack is thus prevented.

As shown clearly in Fig. 2, the present type of furnace readily lends itself to multiple spout discharge. In this way a plurality of spouts 15 can discharge into a single blow chamber and the capacity of the unit be doubled by the addition of one or more additional spouts without requiring any appreciable additional equipment, thus materially reducing plant operation but securing increased production without any material injuries in attendance or maintaining charges or capital investment. The rate of flow of the material through the stack can be regulated to take care of the desired number of outlets or spouts.

As shown in Fig. 1 each of the blasts 17 may be controlled by a valve 117 so that the pressure may be regulated. Since the streams 16 discharge from different parts of the furnace, and since the temperature may vary slightly, said streams are of slightly different viscosities. The several streams having a slightly different viscosity and the several blasts or nozzles 17 having different pressures can produce any final type of material and such a material will include a mixture of materials made under different conditions, that is, one nozzle may blow a coarse strong fiber and another nozzle may blow nothing but fuzz. These two extreme types of materials when intermingled in the blow chamber 118 having the opening 119 produce a material of good mechanical strength as well as good insulating value and to a degree not obtainable with a single nozzle.

The invention claimed is:

1. The method of manufacturing molten material for rock and mineral wools which comprises maintaining a blast flame of pulverized fuel, maintaining a supply of raw material, withdrawing a continuous relatively thin stream of material from said supply, preheating said stream of raw material by passing it in countercurrent relationship to the products of combustion from said flame, controlling said preheating operation whereby said raw material, at the end thereof, is substantially at its melting temperature, projecting said preheated material directly across said flame, whereby it is melted, connecting said melted material in a pool, and withdrawing said melted material from said pool at points of different temperature in a plurality of streams in the presence of a plurality of jets, whereby said molten material is formed into wool.

2. The method of manufacturing mineral wool which comprises maintaining a pool of the molten rock, supplying sufficient heat to said pool to maintain its fluidity and withdrawing said material in a plurality of streams from different points of temperature of said pool and contacting a jet with each of said streams whereby said molten material is formed into wool.

3. In making mineral wool, the method which comprises melting a suitable material of the type described, discharging the molten product in a plurality of streams of differing viscosities, and shredding the material in the several streams into mineral wool.

4. In making mineral wool, the method which comprises melting a suitable raw material of the type described, discharging the molten product in a plurality of streams of differing viscosities, shredding the material in the several streams into mineral wool, and intermingling the wool produced from the several streams.

5. The method of manufacturing mineral wool insulating material comprising the steps of reducing a mineral material to form a plurality of molten streams, shredding the streams by blasts to produce different types of textured fibre, and intermingling the types of fibres.

6. The method of manufacturing mineral wool insulating material comprising the steps of reducing a mineral material to form a plurality of molten streams, shredding the streams by independently controlled blasts to produce different types of textured fibre, and intermingling the types of fibres.

7. The method of producing mineral wool fibres which comprises placing a suitable solid, raw mineral wool forming material into a furnace, melting the raw material to form a pool of molten material, discharging said molten material directly from said pool in a plurality of discrete streams, and discharging a gaseous medium under pressure against said streams at such velocity as to disintegrate said streams to form mineral wool fibres.

EDWARD R. POWELL.